Dec. 5, 1944.  C. P. STOCKER  2,364,558

RECTIFYING ARRANGEMENT

Filed May 6, 1943

INVENTOR.
CLOSMAN P. STOCKER
BY Woodling and Krost
ATTORNEYS.

Patented Dec. 5, 1944

2,364,558

UNITED STATES PATENT OFFICE 2,364,558

RECTIFYING ARRANGEMENT

Closman P. Stocker, Lorain, Ohio, assignor of one-half to E. M. Heavens

Application May 6, 1943, Serial No. 485,836

21 Claims. (Cl. 175—363)

This invention relates to a rectifying arrangement and in particular to a system for supplying constant-voltage direct current from a variable-voltage source of alternating current.

The invention utilizes a leakage-reactance saturable transformer together with a capacitor and a polyphase rectifier in obtaining polyphase rectification from a single-phase alternating-current source. Under light loads the rectifiers are supplied predominantly with single-phase voltage, the addition of load shifting the phases and thereby tending to increase the rectified voltage, compensating for the resistance and reactance voltage drops in the circuit. Changes in the single-phase supply voltage are likewise compensated in the same transformer by a combination of saturation and phase-shifting effects.

It is an object of my invention to supply constant-voltage rectified current from a variable-voltage alternating current source.

It is another object of my invention to produce polyphase rectification from a single-phase source.

Another object of my invention is to compensate for changes of load and changes of input voltage in a single control transformer.

A further object of my invention is to compensate a rectified voltage for changes of load and for changes of input voltage in a single compensating unit utilizing a leakage-reactance transformer.

Another object of my invention is to reduce the ripple voltage in the output of a rectifier energized from a single-phase source by producing polyphase rectification.

Still another object of my invention is to provide a compact system of regulated rectification having a high efficiency.

An additional object of my invention is to provide a regulated rectification system having improved dynamic characteristics.

Figure 1:
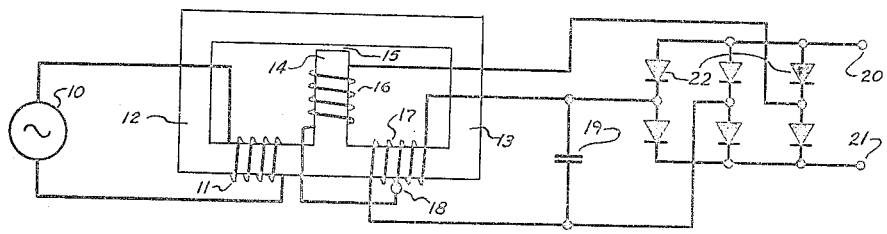
Figure 2:
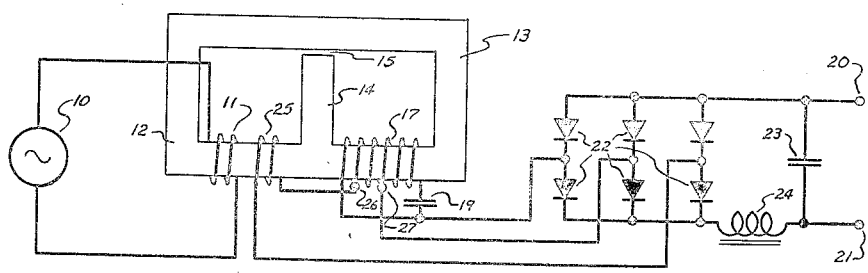
Figure 3:
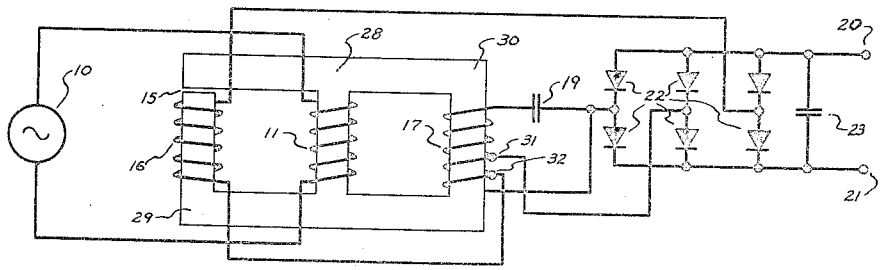

Other objects and a better understanding of my invention may be had by referring to the following specification and claims in connection with the accompanying drawing in which Figure 1 is the circuit diagram of an embodiment of my invention with the leakage reactance transformer shown diagrammatically and with a winding on the leakage flux path, Figure 2 is a modification of Figure 1 omitting the windings on the leakage flux path and showing a filter on the rectified output, and Figure 3 is an embodiment of my invention using a transformer structure different from those shown in Figures 1 and 2, and using a condenser-input filter on the output.

With more particular reference to Figure 1, there is shown a magnetic core having two flux paths, the one including the core section 13, the other including the core section 14, with the section 12 being common to both flux paths. The flux path including the sections 12 and 13 is a substantially closed path which may become saturated under high magnetizing forces although I prefer to have a greater cross sectional area in section 12 than in section 13. By this construction I am able to operate core section 12 at a lower flux density than section 13. The flux path through section 14 has a non-magnetic gap 15 in series and therefore represents a leakage path requiring a relatively high magnetizing force to highly magnetize the gap 15.

The two flux paths are magnetized by winding 11 on the common section 12, winding 11 in turn receiving its energy from the single-phase alternating current source 10. Thus the vectorial sum of the fluxes through sections 13 and 14 is substantially equal to the flux in section 12, which is substantially proportional to the voltage of source 10.

Capacitor 19 is connected across winding 17 on section 13. Winding 16 on core section 14 is connected to tap 18 on winding 17 and to the three-phase rectifiers 22. The two other lines supplying the rectifiers 22 are connected to winding 17. The direct current output of the rectifiers 22 is supplied to terminals 20 and 21.

The capacitive current through winding 17 shifts the phase of the flux through core section 13 with respect to the flux in section 14, the amount of phase shift varying in response to changes in the load on terminals 20 and 21. In addition, the amount of flux through core section 14 is determined to a considerable extent by the amount of load current which is drawn from terminals 20 and 21.

When the direct current supplied from the output terminals 20 and 21 is of a low value, the rectification taking place is predominantly of a single phase and the rectified voltage roughly approximates the average value of the applied voltage of that phase. As the load current increases, the change in phase relationship between the fluxes in core sections 13 and 14 is used to impress a polyphase or in this case a three-phase voltage on the rectifiers 22, and under a particular load condition the three-phase voltage may become nearly balanced. Under this condition the average value of the rectified voltage rises nearly to the crest value of the applied voltage. Thus, by gradually changing from single-phase to polyphase rectification as the load is increased, an increase in rectified voltage is obtained compensating for the voltage drop through the rectifiers and other circuit resistances.

The core section 13 is preferably operated at a high flux density, and the magnetizing force across it produces some flux through section 14 even when the load current is small. Capacitor 19 supplies part of the magnetizing current for section 13; under some conditions it may supply the entire reactive component of this magnetizing current and when this is the case, the magnetizing force across the air gap 15 may be relatively small, but responsive to changes in the voltage of source 10. These changes in voltage produce changes both in the magnitude and phase of the flux through core section 14, and according to my invention I am able to use these flux changes to maintain a constant rectified voltage across output terminals 20 and 21 in spite of variations in the voltage of source 10 and in spite of variations of the rectified output current.

My control circuit responds very rapidly to changes in load current or to changes in input voltage, and switching transients therefore have little effect on the value of the rectified voltage across output terminals 20 and 21.

Tap 18 may be centrally located on winding 17 and the fluxes in the two core sections 13 and 14 may be ninety degrees out of phase with each other, in which case the interconnection of windings 16 and 17 becomes a Scott connection for conversion from two-phase to three-phase systems. It is not necessary for the tap 18 to be a center-tap, however, its optimum location being determined by the magnetic characteristics of the core material, the relative dimensions of the different core sections and so on. It is to be understood that the drawing is diagrammatic in nature and is not intended to show the proportions of the core structure or of the non-magnetic gap, and that numerous departures from the proportions and configurations shown may be made without departing from the true spirit and scope of this invention.

In general, I prefer to construct the core so that the common portion of the core, which in the drawing carries the primary winding, has a greater cross-sectional area than the saturable portion of the core.

Although the drawing shows a common type of three-phase rectifier connection, other arrangements may be used if preferred. The rectifiers need not be three-phase, as other polyphase arrangements can be adapted to the operation of my invention.

In the arrangement of Figure 2, the winding 16 shown on the core section 14 in Figure 1 is omitted. This omission does not necessarily change any of the essential features of the operation of my invention as described in connection with Figure 1. Since the vectorial sum of the fluxes in sections 13 and 14 is substantially equal to the flux in section 12, the effect of a winding on any one of the sections can be substantially duplicated by the proper combination of windings on the other two sections. This combination is obtained by properly locating tap 26 on winding 17 and by the proper phasing and proportioning of winding 25. Figure 2 shows winding 17 as a relatively high voltage winding used to impress on capacitor 19 a voltage sufficiently great to permit the use of an economical size of capacitor. Tap 27 on winding 17 is located in accordance with the location of tap 26 to provide the proper voltage to the rectifiers 26 and to produce the operating characteristics described in connection with Figure 1.

Figure 2 shows a simple filtering arrangement interposed between the rectifiers 22 and the output terminals 20 and 21. With this arrangement I am able to supply direct current output with a very small alternating current ripple component. The filtering can be accomplished with unusually small filter components because under heavy loads the polyphase rectification produces a rectified voltage with a small ripple component, and it is not necessary to provide a large air gap in the magnetic circuit of filter inductance 24. Under heavy loads the impedance of the inductance 24 may be reduced by the direct current flowing through it without increasing the A. C. component of the output voltage, because as the load increases the A. C. component delivered by the rectifiers diminishes. Under light loads, the higher impedance of inductance 24 provides the necessary filtering and also holds the output voltage at the average value of the rectified voltage and prevents the capacitor 23 from becoming charged to the crest value of the rectified voltage. In addition, with my invention I am able to produce a condition under which the no-load voltage across terminals 20 and 21 is not much greater than the normal output voltage, because of the wave-shape of the voltage supplied to the rectifiers.

By using a relatively small filter inductance, I am able to obtain improved dynamic characteristics in the output voltage, and sudden changes in load resistance produce relatively small fluctuations in the output voltage. When a large filter inductance is used, the sudden removal of the load requires that the large amount of stored energy in the inductance must be stored in the filter condenser, and this requires a relatively great increase in the voltage across this condenser. The smaller energy storage of a small filter inductance produces a correspondingly smaller voltage increase.

Figure 3 shows diagrammatically a somewhat different core structure than that shown in Figures 1 and 2. In this figure, the energizing winding 11 is arranged on the central core member 28. The core section 30 is a substantially closed flux path having the winding 17 on it. The winding 17 is again shown supplying a relatively high voltage to the capacitor 19. Tap 31 is located to supply the required voltage to the rectifier 22 and tap 32 is connected to winding 16 which supplies the out-of-phase component to the polyphase rectifiers. Winding 16 is on core section 29 which has a non-magnetic gap 15. Core section 29 in Figure 3 corresponds to core section 14 in Figures 1 and 2. Section 28 in Figure 3 is the core-portion common to both flux paths and corresponds to section 12 in Figures 1 and 2. Section 30 is the saturable portion and corresponds to section 13 in Figures 1 and 2.

The fundamental principles of operation as described in connection with Figure 1 apply to Figure 3, the chief differences being quantitative rather than qualitative, because of the relative lengths of the flux paths.

Figure 3 also shows a different filtering arrangement than that shown in Figure 2. The capacitor 23 in Figure 3 is connected directly across the output of the rectifiers, acting as a condenser-input filter. I have found that the regulating characteristics of my rectifying arrangement can be obtained not only with the choke-input filter as shown in Figure 2, but also with the condenser-input filter of Figure 3.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A rectifying arrangement, comprising in combination a polyphase rectifier; a leakage reactance type transformer and a capacitor, said transformer having a plurality of windings one of which is adapted to be connected across a source of single phase alternating current, another of said plurality of windings being connected in parallel with the capacitor, and circuit means for connecting at least two of said plurality of windings to said polyphase rectifiers, said transformer having a main flux path with a saturable portion and a leakage flux path magnetically disposed in parallel with the saturable portion, said capacitor supplying at least a part of the magnetizing current for the said saturable portion.

2. A rectifying arrangement, comprising in combination a polyphase rectifier; a leakage reactance type transformer and a capacitor, said transformer having a plurality of windings one of which is adapted to be connected across a source of single phase alternating current, another of said plurality of windings being connected in parallel with the capacitor, and circuit means for connecting at least two of said plurality of windings to said polyphase rectifiers, said plurality of windings being proportioned to supply polyphase voltage to said rectifiers under normal loading, said transformer having a main flux path with a saturable portion and a leakage flux path magnetically disposed in parallel with the saturable portion, said capacitor supplying at least a part of the magnetizing current for the said saturable portion.

3. A rectifying arrangement, comprising in combination, a polyphase rectifier, a transformer having a plurality of magnetic flux paths at least three of which operate at different flux densities, a capacitor and a plurality of winding means on at least two the plurality of magnetic flux paths, one of the winding means being adapted for connection to a source of single phase alternating current, another of said winding means being connected in parallel with said capacitor, and circuit connecting means for energizing the polyphase rectifiers from said plurality of winding means, said capacitor supplying at least a part of the magnetizing current for the flux path having the highest flux density.

4. A rectifying arrangement, comprising in combination, a polyphase rectifier, a transformer having a plurality of magnetic flux paths at least three of which operate at different flux densities, a capacitor and a plurality of winding means on at least two of the plurality of magnetic flux paths, one of the winding means being adapted for connection to a source of single phase alternating current, another of said winding means being connected in parallel with said capacitor, and circuit connecting means for energizing the polyphase rectifiers from at least two of said plurality of winding means, said capacitor supplying at least a part of the magnetizing current for the flux path having the highest flux density.

5. A control circuit adapted to be energized by a source of single phase alternating current, comprising in combination, a plurality of magnetic flux paths having differing characteristics, winding means on said flux paths adapted to be energized by said source to produce total flux linkages proportional to the voltage of said source, a capacitor supplying at least a part of the magnetizing current for one of said magnetic flux paths, output circuit means inductively related to at least two of said magnetic flux paths, and a polyphase rectifier energized by said output circuit means, one of said magnetic flux paths being a leakage flux path disposed magnetically in parallel with said flux path receiving magnetizing current from the capacitor.

6. In combination with a single-phase source of alternating current, a magnetic core having a plurality of magnetic flux paths of differing magnetization characteristics, winding means on said flux paths connected to said source of alternating current, a capacitor supplying at least part of the magnetizing current for one of said flux paths, another of said magnetic flux paths constituting a leakage path, output circuit means inductively related to said flux paths, and a polyphase rectifier energized by said output circuit means.

7. A rectifier circuit adapted to be energized by a source of single phase alternating current of varying voltage and to supply a variable direct current load with substantially constant voltage, said circuit comprising a magnetic core having a plurality of magnetic flux paths with a common portion, one of said flux paths having a non-magnetic gap, another being a substantially closed magnetic circuit, first winding means on said core, said first winding means being on the common portion, second winding means on said core, a capacitor connected across said second winding means supplying at least part of the exciting current for said closed magnetic flux path, output circuit means inductively related to said flux paths, and a polyphase rectifier energized by said output circuit means.

8. A rectifying arrangement comprising in combination a magnetic core having two magnetic flux paths with a common member, winding means on said common member adapted to be energized from a source of single phase alternating current, one of said flux paths being saturable, the other having a non-magnetic gap therein, a winding on said saturable flux path, a capacitor connected across said winding, output circuit means inductively related to both of said flux paths, and a polyphase rectifier connected to said output circuit means.

9. A rectifying arrangement comprising in combination a magnetic core having two magnetic flux paths with a common member, winding means on said common member adapted to be energized from a source of single phase alternating current, one of said flux paths being saturable, the other having a non-magnetic gap therein, a winding on said saturable flux path, a capacitor connected across said winding, output circuit means inductively related to both of said flux paths, and a polyphase rectifier connected to said output circuit means, said rectifying arrangement being adapted to shift from single-phase rectification under light loads to polyphase rectification under heavier loads.

10. A rectifying arrangement comprising in combination a magnetic core having two magnetic flux paths with a common member, winding means on said common member adapted to be energized from a source of single phase alternating current, one of said flux paths being saturable, the other having a non-magnetic gap therein, a winding on said saturable flux path, a capacitor connected across said winding, output circuit means inductively related to both of said flux paths, and a three-phase rectifier connected to said output circuit means.

11. A rectifying arrangement comprising in combination a magnetic core having two magnetic flux paths with a common member, winding means on said common member adapted to be energized from a source of single phase alternating current, one of said flux paths being saturable, the other having a non-magnetic gap therein, a winding on said saturable flux path, a capacitor connected across said winding, output circuit means inductively related to both of said flux paths, and a three-phase rectifier connected to said output circuit means, said rectifying arrangement being adapted to shift from single-phase rectification under light loads to three-phase rectification under heavier loads.

12. A rectifying arrangement comprising in combination a magnetic core having two magnetic flux paths with a common member, winding means on said common member adapted to be energized from a source of single phase alternating current, one of said flux paths being saturable, the other having a non-magnetic gap therein, a winding on said saturable flux path, a first capacitor connected across said winding, output circuit means inductively related to both of said flux paths, a three-phase rectifier connected to said output circuit means, and a second capacitor connected across the direct current terminals of said three-phase rectifier.

13. A rectifying arrangement adapted to be energized by a source of single phase alternating current of varying voltage and to supply a variable direct current load with substantially constant voltage, comprising in combination with rectifying means, a capacitor, a transformer having a plurality of magnetic flux paths at least three of which operate at different flux densities, and a plurality of winding means on at least two of the plurality of magnetic flux paths, one of the winding means being adapted for connection to the source of alternating current, another of said winding means being connected in parallel with said capacitor, and circuit means connecting at least two of the plurality of winding means with said rectifying means, said transformer and capacitor being so related that, at the normal loading of the arrangement, the respective transformer voltages of said windings have a polyphase relationship, said capacitor supplying at least a part of the magnetizing current for the flux path having the highest flux density.

14. A rectifying arrangement, comprising in combination with rectifying means, a leakage reactance type transformer and a capacitor, said transformer having a plurality of windings, one of which is adapted to be connected across a source of single phase alternating current, another of said plurality of windings being connected in parallel with the capacitor, and circuit means for connecting at least two of said plurality of windings to said rectifying means, the reactance of said windings being so proportioned in relation to each other and to a given normal load to be connected across the rectifying means that, when said transformer is energized by a source of single phase alternating current, the voltages produced across said windings and effective through the rectifying means across the load, have a polyphase relationship, said transformer having a main flux path with a saturable portion and a leakage flux path magnetically disposed in parallel with the saturable portion, said capacitor supplying at least a part of the magnetizing current for the said saturable portion.

15. A rectifier circuit comprising in combination, a polyphase rectifier, a capacitor, a magnetic core having a plurality of flux paths with a common portion, one of said flux paths being saturable, another having a non-magnetic gap therein, a first winding on said common portion adapted to be energized from a source of single-phase alternating current, a second winding on said saturable flux path, said capacitor being connected substantially across said second winding, a third winding on the said flux path having the non-magnetic gap, and circuit means interconnecting said second and third windings with the polyphase rectifier and supplying it with polyphase alternating current under the normal loading of the circuit.

16. A rectifying arrangement comprising in combination, a polyphase rectifier, a capacitor, a magnetic core having a plurality of flux paths with a common portion, one of said flux paths being saturable, another having a non-magnetic gap therein, a first winding on said common portion adapted to be energized from a single-phase source of alternating current, a second winding on said saturable flux path, said capacitor being connected substantially across said second winding, a third winding means being magnetically coupled to said first winding means, and circuit means interconnecting said second and third windings means with the polyphase rectifier and supplying it with polyphase alternating current under the normal loading of the arrangement.

17. A rectifying arrangement comprising in combination, a magnetic core having a plurality of magnetic flux paths, one of said flux paths being a substantially closed magnetic circuit, another having a non-magnetic gap therein, first winding means on said core adapted to be energized by a single-phase source of alternating current to magnetize said magnetic flux paths, second winding means on said magnetic core, a capacitor connected to said second winding means, said arrangement being adapted to produce under normal loads a phase displacement between the voltage across the first winding means and the voltage across the second winding means, and circuit means utilizing said phase displacement in energizing polyphase rectifiers with polyphase current.

18. A rectifying arrangement comprising in combination, a magnetic core having a plurality of magnetic flux paths, one of said flux paths being a substantially closed magnetic circuit, another having a non-magnetic gap therein, first winding means on said core adapted to be energized by a single-phase source of alternating current to magnetize said magnetic flux paths, second winding means on said magnetic core, a capacitor connected to said second winding means, said capacitor supplying at least part of the magnetizing current for said substantially closed magnetic circuit, and output circuit means energized by the flux in said magnetic flux paths supplying a polyphase rectifier.

19. A rectifying arrangement, comprising in combination a polyphase rectifier, a capacitor and a leakage reactance type transformer having a closed magnetic core comprising first and second core portions and a leakage flux path adapted to by-pass part of the flux of either core portion around the other core portion, a primary winding on said first core portion adapted to be connected to a source of single phase alternating current of fluctuating voltage, a winding on said second core portion energizing said condenser and winding means on both first and second core portions connected to said polyphase rectifier.

20. A rectifying arrangement, comprising in combination a polyphase rectifier, a capacitor and a leakage reactance type transformer having a closed magnetic core comprising first and second core portions and a leakage flux path adapted to by-pass part of the flux of either core portion around the other core portion, a primary winding on said first core portion adapted to be connected to a source of single phase alternating current of fluctuating voltage, a winding on said second core portion energizing said condenser and winding means on both first and second core portions connected to said polyphase rectifier, the magnetic density at maximum predetermined input voltage of first core portion being less than the maximum density of said second core portion.

21. A rectifying arrangement, comprising in combination a polyphase rectifier, a capacitor and a leakage reactance type transformer having a closed magnetic core comprising first and second core portions, a primary winding on said first core portion adapted to be connected to a source of single phase alternating current of fluctuating voltage, a winding on said second core portion energizing said condenser and winding means on both first and second core portions connected to said polyphase rectifier, said core having magnetically disposed between windings on said first and second core portions a magnetically permeable shunt with a non-magnetic gap portion.

CLOSMAN P. STOCKER.